US009205397B2

(12) United States Patent
Delamarche et al.

(10) Patent No.: US 9,205,397 B2
(45) Date of Patent: Dec. 8, 2015

(54) MICROFLUIDIC DEVICE WITH INTERCONNECTS

(71) Applicant: International Business Machines Corporation, Armonk, NY (US)

(72) Inventors: Emmanuel Delamarche, Thalwil (CH); Govind Kaigala, Zurich (CH); Robert Lovchik, Schoenenberg (CH)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 13/658,036

(22) Filed: Oct. 23, 2012

(65) Prior Publication Data
US 2013/0098481 A1 Apr. 25, 2013

(30) Foreign Application Priority Data
Oct. 25, 2011 (EP) .................................. 11186479

(51) Int. Cl.
*F16L 41/00* (2006.01)
*B01J 19/00* (2006.01)
*B01L 3/00* (2006.01)

(52) U.S. Cl.
CPC ....... *B01J 19/0093* (2013.01); *B01L 3/502715* (2013.01); *B01J 2219/00783* (2013.01); *B01J 2219/00813* (2013.01); *B01L 2200/027* (2013.01); *B01L 2200/0689* (2013.01); *B01L 2300/0816* (2013.01); *F16L 41/00* (2013.01); *Y10T 29/49826* (2015.01); *Y10T 137/85938* (2015.04)

(58) Field of Classification Search
CPC .................................................... F16L 41/00
USPC ...................................... 137/833, 594; 138/37
See application file for complete search history.

(56) References Cited

U.S. PATENT DOCUMENTS

| 5,904,424 A * | 5/1999 | Schwesinger et al. ........ 366/336 |
| 6,284,113 B1 * | 9/2001 | Bjornson et al. .............. 204/453 |
| 6,843,281 B1 * | 1/2005 | Barth et al. ...................... 141/5 |
| 7,217,396 B2 | 5/2007 | Liu et al. |

(Continued)

FOREIGN PATENT DOCUMENTS

| CN | 2226596 Y | 5/1996 |
| EP | 1 243 314 A2 | 9/2002 |

OTHER PUBLICATIONS

Bings, N. H. et al., Microfluidic devices connected to glass capillaries with minimal dead volume, Anal. Chem., 1999, pp. 3292-3296, 71 (15).

(Continued)

*Primary Examiner* — John K Fristoe, Jr.
*Assistant Examiner* — Christopher Ballman
(74) *Attorney, Agent, or Firm* — Scully, Scott, Murphy & Presser, P.C.; Jennifer Davis, Esq.

(57) ABSTRACT

A microfluidic device with interconnects. The device includes a first layer; a second layer, the first layer and the second layer assembled such as to face each other; a microchannel in said second layer; a tapered conduit having a tapered portion, wherein the tapered portion is inserted in a correspondingly shaped via formed in the first layer at the level of an end of the microchannel such that fluid communication is enabled between the microchannel and the conduit, and blocked in the via by way of the assembled first layer and second layer.

19 Claims, 6 Drawing Sheets

(56) References Cited

U.S. PATENT DOCUMENTS

| | | | |
|---|---|---|---|
| 7,790,109 B2* | 9/2010 | Kim et al. | 422/68.1 |
| 2001/0020588 A1* | 9/2001 | Adourian et al. | 204/451 |
| 2002/0025279 A1* | 2/2002 | Weigl et al. | 422/100 |
| 2003/0026740 A1 | 2/2003 | Staats | |
| 2004/0206399 A1* | 10/2004 | Heller et al. | 137/375 |
| 2004/0223886 A1 | 11/2004 | Liu et al. | |
| 2007/0161051 A1* | 7/2007 | Tsinberg et al. | 435/7.2 |
| 2008/0282979 A1* | 11/2008 | Chen et al. | 118/722 |
| 2010/0024908 A1* | 2/2010 | Yasuda | 137/833 |
| 2010/0233038 A1 | 9/2010 | Park et al. | |
| 2010/0247384 A1* | 9/2010 | Takayama et al. | 422/100 |

OTHER PUBLICATIONS

Brody, J.P., Biotechnology at low Reynolds Numbers, Biophys. J., 1996, pp. 3430-3441, vol. 71.

Chen, C. F. et al., High-pressure needle interface for thermoplastic microfluidics, Lab Chip, 2009, 9(1):50-5.

Chiou, C. et al., Minimal dead-volume connectors for microfluidics using PDMS casting techniques, J. Micromech, Microeng, 2004, 14, 1484-1490.

Hartmann, D. M. et al., A low-cost, manufacturable method for fabricating capillary and optical fiber interconnects . . . , Lab on a Chip, 2008, pp. 609-616, 8.

Kenis P.J.A. et al., 1999 Microfabrication Inside Capillaries Using Multiphase Laminar Flow Patterning, Science, 1998, pp. 83-85, vol. 285, No. 5424.

Knight, J.B., et al., Hydrodynamic Focusing on a Silicon Chip: Mixing Nanoliter in Microseconds, Phys. Rev. Lett., 1998, pp, 3863-3866, vol. 80, No. 17.

Puntambekar, A. et al., Self-aligning microfluidic interconnects for microfluidic systems, J. Micromech. Microeng. 2002, pp. 35-40, 12.

Sabourin, D. et al., Interconnection blocks with minimal dead volumes permitting planar interconnection . . . , Microfluidics & Nanofluidics, 2010, pp. 87-93, vol. 9, No. 1.

Squires, T.M. et al., Microfluidics: Fluid physics at the nanoliter scale, Rev. Mod. Phys., 2005, pp. 977-1026, vol. 77.

Thorsen, T. et al., Microfluidic Large-Scale Integration, Science, 2002, pp. 580-584, vol. 298 No. 5593.

English Language Abstract, JP 2006-349347 A, Dec. 28, 2006.

English Language Abstract, JP 2010-185558 A, Aug. 26, 2010.

English Language Abstract, JP 2005-118736 A, May 12, 2005.

International Search Report, PCT/IB2012/05535, mailed Mar. 12, 2013.

* cited by examiner

MICROFLUIDIC DEVICE WITH INTERCONNECTS

CROSS REFERENCE TO RELATED APPLICATION

This application claims priority under 35 U.S.C. 119 from European Application 11186479.9, filed Oct. 25, 2011, the entire contents of which are incorporated herein by reference.

BACKGROUND OF THE INVENTION

1. Field of the Invention

The invention relates in general to the field of microfluidic devices and methods of fabrication thereof. In particular, it is directed to microfluidic devices provided with interconnects.

2. Description of the Related Art

Microfluidics generally refers to microfabricated devices, which are used for pumping, sampling, mixing, analyzing and dosing liquids. Prominent features thereof originate from the peculiar behavior that liquids exhibit at the micrometer length scale (see Brody J. P., Yager P., Goldstein R. E., and Austin R. H., Biotechnology at low Reynolds Numbers, Biophys. J. 1996, pp. 3430-3441, 71, and Knight J. B., Vishwanath A., Brody J. P. and Austin R. H., Hydrodynamic Focusing on a Silicon Chip: Mixing Nanoliter in Microseconds, Phys. Rev. Lett. 1998, pp. 3863-3866, 80). Flow of liquids in microfluidics is typically laminar. Volumes well below one nanoliter can be reached by fabricating structures with lateral dimensions in the micrometer range. Reactions that are limited at large scales (by diffusion of reactants) can be accelerated (see Squires T. M. and Quake S. R. Microfluidics: Fluid physics at the nanoliter scale, Rev. Mod. Phys. 2005, pp. 977-1026, 77). Finally, parallel streams of liquids can possibly be accurately and reproducibly controlled, allowing for chemical reactions and gradients to be made at liquid/liquid and liquid/solid interfaces (Kenis P. J. A., Ismagilov R. F. and Whitesides G. M., Microfabrication Inside Capillaries Using Multiphase Laminar Flow Patterning, Science, 1999, pp. 83-85, 285). Microfluidics are accordingly used for various applications in life sciences.

Many microfluidic devices have user chip interfaces and closed flow paths. Closed flow paths facilitate the integration of functional elements (e.g. heaters, mixers, pumps, UV detectors, valves, etc.) into one device while minimizing problems related to leaks and evaporation.

Liquids processed within microfluidic devices are generally introduced using fluidic interconnects. However, such interconnects may not be suitable for all applications.

For example, a solution developed in N. H. Bings et al., Anal. Chem., 1999, pp. 3292-3296, 71 (15), relies on holes partially drilled into glass and fused silica inserted therein. However, the obtained interconnect is manifestly not suitable for high mechanical stress.

Another solution (see e.g., C. Chiou et al., J. Micromech. Microeng., 2004, 1484, 14) consists of inserting a capillary into a Teflon casing, the latter being in turn glued into a drilled hole. Yet, this solution requires a complex, expensive assembly.

Still another solution (see e.g., A. Puntambekar et al., J. Micromech. Microeng., 2002 pp. 35-40, 12) is to use a composite tube-locking system using polymer flanged inserts. However, this solution involves a complex assembly, composite material, and is expensive.

Furthermore, each of the above solutions is labor intensive. For the sake of completeness, other solutions have been developed. See, e.g., D. Sabourin et al., Microfluidics & Nanofluidics, 2010, pp. 87-93, vol. 9, no. 1; T. Thorsen et al., Science, 2002, pp. 580-584, Vol. 298 no. 5593; C. F. Chen et al., 2009, 9(1):50-5, Lab Chip; D. M. Hartmann et al., 2008, pp. 609-616, Lab on a Chip, 8.

Such solutions, however, are not suitable for many applications. These solutions are too complex or too specific, not suitable for several materials such as glass and silicon, or labor intensive, etc.

Finally, what is perhaps the most widely used solution relies on commercially available ports (see e.g., Upchurch Scientific) that are glued onto the microfluidic device, see, e.g., www.idex-hs.com/. However, this solution results in a large footprint and gives rise to substantial dead volumes. It further requires aligning a port over a hole, which may be time consuming and require an instrument for alignment.

BRIEF SUMMARY OF THE INVENTION

To overcome these deficiencies, the present invention provides a microfluidic device including: a first layer; a second layer, the first layer and the second layer assembled such as to face each other; a microchannel in the second layer; and, a tapered conduit having a tapered portion, wherein the tapered portion is inserted in a correspondingly shaped via formed in the first layer at the level of an end of the microchannel such that fluid communication is enabled between the microchannel and the conduit; and, blocked in the via by way of the assembled first layer and second layer.

According to another aspect, the present invention provides a method of fabrication of microfluidic device, including: patterning a first layer and a second layer to respectively obtain a shaped via and a microchannel; inserting a conduit through the via, until a tapered portion fits in a correspondingly shaped via formed in the first layer; and assembling the first layer and the second layer so as to bond them, wherein the via is assembled over the microchannel.

DETAILED DESCRIPTION OF THE PREFERRED EMBODIMENTS

As an introduction to the following description, general aspects of the invention directed to microfluidic devices will first be discussed. Such devices have at least two layers facing each other, with a microchannel provided in the second layer, e.g., as a groove open at the level of an interface between the two layers. A tapered conduit is inserted in a correspondingly shaped via formed in the first layer, at the level of an end of the microchannel. If necessary, one end of the conduit may protrude from the first layer, opposite to the second layer. The other (wider) end of the tapered conduit is arranged such that fluid communication is enabled with the microchannel. The tapered conduit is blocked in the via by way of the assembled layers. Such a design provides a mechanically robust, ideally leak-free interconnect, that is easily and quickly fabricated, and can furthermore be designed to have a small footprint. This design is furthermore easily cloned to form an array on a chip.

Figure 1:
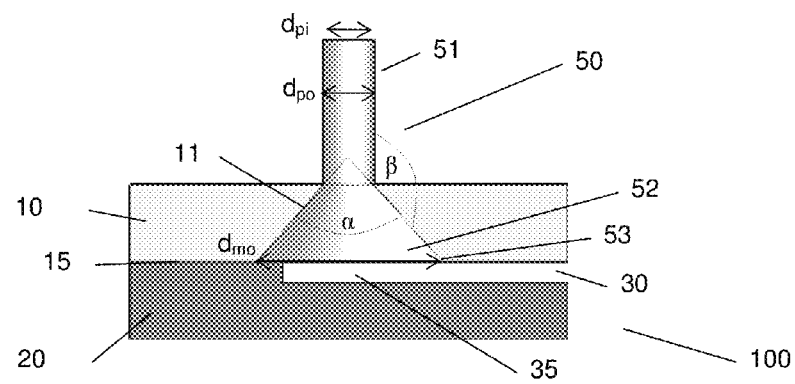
FIG. 1 is a section view of a device according to embodiments, with the section cut through a tapered conduit of the device.
Figure 2:
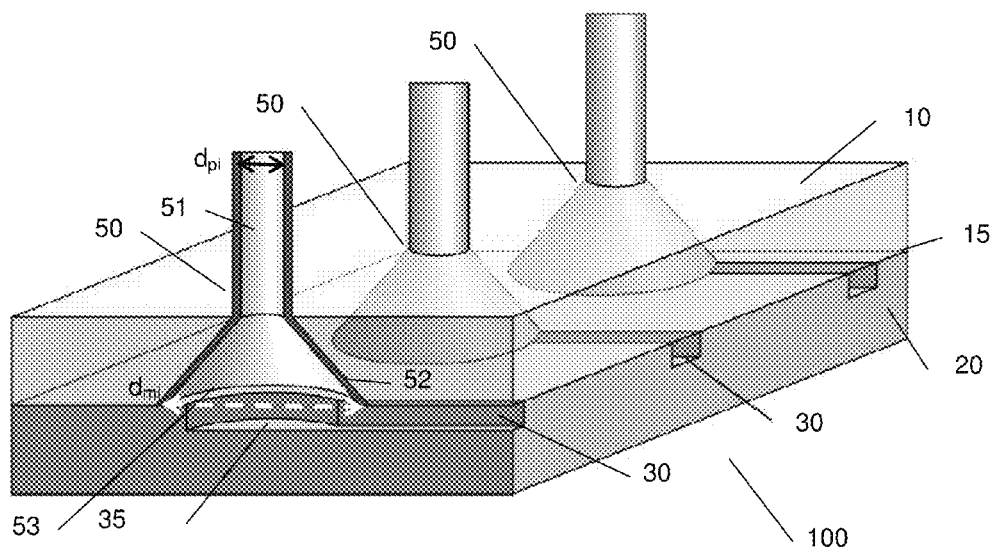
FIG. 2 is a perspective view of a device including several tapered conduits, according to embodiments, with a section through a conduit of the device.

FIG. 1 and FIG. 2 depict a microfluidic device 100 according to embodiments of the present invention. FIG. 1 is a section view of the device (the section cut through a conduit of the device), while FIG. 2 is a perspective view of a device including several conduits (with a section through one of the conduits).

As said, the device 100 includes a first layer 10 and a second layer 20, which faces the first layer. How the first layer is fixed with the second layer is unimportant with respect to the particulars of this invention (several methods are known to fix two layers in a microfluidic device). One or more microchannels 30 are furthermore provided in the second layer, e.g., at the level of an interface 15 between the first layer 10 and the second layer 20. In the examples of FIGS. 1 and 2, the interface essentially restricts to a boundary surface between the two layers 10 and 20, although, in variants, the interface could be physically embodied as an additional layer provided between layers 10 and 20, e.g., for bonding the two layers 10 and 20. In addition, one or more tapered conduits are provided. As seen in the drawings, a tapered conduit 50 is inserted in a correspondingly shaped via 11 formed in the first layer 10, at the level of an end 35 of a microchannel 30. The conduit 50 extends along a direction that intersects the interface 15. In each of the examples depicted in the appended drawings, the conduits include two distinct portions: a pipe portion 51 and a tapered portion 52, where the tapered portion resembles a flared mouth of a funnel. However, a conduit only needs to be tapered (at least in part). In this respect, only the external envelope of the conduit 50 needs to be tapered. On the contrary, the inner, hollow cavity can for instance be, e.g., cylindrical (with a constant section) or be conical, etc., or have any suitable profile. These portions are hollow cavities that enable fluid communication through the conduit.

When the conduits are provided with distinct pipe portions 51, the latter may possibly extend from an upper surface of the first layer 10, opposite to the second layer 20, to allow for easy insertion of the tubes (and also for using thinner layers, all things being equal). In variants, the upper edge of a conduit can be arranged flush with the upper surface of the first layer 10, or even slightly depressed with respect to this upper surface, which still allows for tube insertion. Note, however, that when pipe portions are protruding from the upper surface of layer 10, then a (smaller diameter) tube can be inserted into a (larger diameter) pipe portion or a (smaller diameter) pipe portion be inserted in a (larger diameter) tube.

The lower end 53 of the tapered portion is arranged, at the level of the end of the microchannel, such as to enable fluid communication between the conduit and the microchannel. The lower end 53, i.e., a peripheral edge, is for instance resting on the upper surface of layer 20, such that the tapered portion 52 is blocked in the via 11 (at least partially) by way of the assembled layers 10 and 20: an interlocked arrangement of the conduit is accordingly obtained. In variants (not shown), this lower end may be arranged in a correspondingly shaped recess. In each case, it contacts an upper surface of layer 20, such that the conduit is blocked in the via. In other variants (not shown), an additional layer or a bonding means can be provided in order to block the conduit in the via. In all cases, a suitable assembly of the layers 10 and 20 is used to block the conduit. One may realize that the tapered conduit 50 is easily inserted in the corresponding via 11, which significantly simplifies the fabrication of the device. Notwithstanding its simplicity, the tapered conduit results in a mechanically robust interconnect.

Also, the same design as shown in FIG. 1 can be cloned into multiple interconnects on a same chip, as illustrated in FIG. 2. In that case, the device 100 includes a set of microchannels 30, typically similar to each other, and a set of conduits 50, each inserted through the first layer. Each conduit is arranged to enable fluid communication with a respective microchannel. Two conduits can, however, connect to a same microchannel, etc. In addition, microchannels may have various designs, e.g., transverse to layer 20 or provided as a groove at the level of the interface 15 and possibly connect to transverse openings provided through the second layer 20, in order to allow for surface processing applications. Many variants can accordingly be contemplated.

Notwithstanding the depicted examples of conduits, one understands that a conduit could have various possible shapes. As said, the external envelope of the body of a conduit is tapered, at least in part. Thus, a conduit can exhibit distinct portions 51 and 52 like in the appended drawings. Yet, a conduit can for instance be a single, continuously tapered, hollow body. Any shape allowing for the wider portion (the flared mouth) to be inserted through a suitably shaped via 11 would be convenient. Also, any shape allowing for insertion of the wider portion and a narrower portion to exit from the upper surface of layer 10 can be contemplated as well. Still, any such conduit could be described as including a wider portion (the mouth) and a narrower portion. Here and for the sake of illustration, we shall hereafter consider that a conduit 50 includes a pipe portion 51 and a tapered portion 52, wherein the pipe 51 is not necessarily cylindrical but is narrower than the tapered portion 52.

As depicted in FIG. 1, the tapered portion preferably exhibits an (average) opening angle $\alpha$ of 60° to 120°, which has been found to be suitable for most applications in practice, offering the required robustness. In an embodiment, this angle is set to 90° (or substantially this value, i.e., this value±10% thereof), which maximizes robustness, especially when layer 10 has a small thickness. If the conduit consists of two distinct portions, i.e., a cylindrical pipe 51 and a conical portion 52, then the external angle $\beta$ is between 150° and 180°.

In this regard, the (vertical) height of the tapered portion 52, i.e., measured along the fluid path direction, is essentially equal to the thickness of the first layer 10. Sufficient robustness can already be achieved with a thickness of 0.3 mm, for many suitable materials. Typically, this thickness is substantially equal to 0.5 mm (or larger than that). Also, the minimal (average) outer diameter $d_{po}$ of the pipe is typically less than 1.6 mm, in most microfluidic applications. Specific applications would require it to be less than 1.0 mm and in other applications substantially equal to 0.8 mm. Also, the average maximal outer diameter $d_{mo}$ of the tapered portion is typically less than 3.0 mm, in specific applications less than 2.0 mm and in other applications substantially equal to 1.5 mm. The lower the outer diameter $d_{mo}$, the denser the interconnect array (or more generally the smaller the required chip area).

Next, the average inner diameter $d_{pi}$ for the pipe section 51 is between 0.3 mm and 0.7 mm. A value of 0.5 mm (±10%) was nonetheless found to be optimal in practice. Similarly, a suitable average inner diameter $d_{mi}$ of the tapered portion 52 is can be between 0.8 and 1.6 mm, and more specifically equal to 1.2 mm. Finally, having a protruding pipe portion is not mandatory, such that a tapered conduit can for instance be restricted to the sole tapered portion 52 and the dimensions given above for the pipe portion can in fact apply to the upper part of the tapered portion 52 as well. Also, note that the examples of diameters given above are "average" diameters, i.e., the corresponding sections need not be circular. For example, a tapered section can advantageously be made square, hexagonal, etc., especially when one wants to avoid rotation after insertion in a respective via. Similarly, the pipe need not be cylindrical. In that case, the "average" diameter is that diameter corresponding to a disk having the same area as the actual cross-sectional area of the actual pipe or tapered section.

In embodiments, the conduit is made chemically inert. It typically includes a single body, the latter preferably coated with a thin-film material to make it chemically inert. The single body can include one of the following materials: a conductive material such as stainless steel or brass, polymer, glass or fused silica. The body can be coated with a thin-film of fluorinated materials (e.g., to make it chemically inert). In addition to a fluidic interconnect, the body can be used as an electrode, i.e., when using a conductive material therefor. Still, the conduit body may be copper coated, gold coated, etc.

In embodiments, at least a portion of a microchannel 30 is provided as a groove 30, open on an upper surface of the second layer 20 (see also FIG. 2). This groove 30 is for instance closed by a portion of a lower surface of the first layer 10, the lower surface of the first layer 10 being the surface facing the upper surface of the second layer 20. Such a microchannel is easily machined, as to be discussed later. However, microchannels may have various configurations, as said earlier. In embodiments, and as depicted in FIGS. 1 and 2, a conduit 50 is arranged transversely, i.e., along a direction perpendicular to the interface 15. Obviously, any (non-degenerate) angle could be contemplated, depending on the type of interconnect needed. However, a transverse configuration is easier to machine and more robust.

In this respect, tests have been performed with devices including anodically bonded glass and silicon, interlocking a single tin-coated brass conduit. The strength of the resulting interconnect has been checked by applying a load of 3.1 kg. The test has been performed for 1 hour, without noticeable degradation of the microfluidic device or the interconnect. For completeness, the device/interface has shown to fail by applying excessively large weight (>5 kg). Namely, the glass in the vicinity of the conduit failed while the interconnect remained intact.

In embodiments, the end 35 of a microchannel 30 is shaped as a depression 35 within the second layer 20. This depression 35 can, just like the portion 30 of the microchannel, be open on the upper surface of the second layer 20. The depression 35 faces the tapered portion 52; its upper (hollow) area is included (or at most inscribed) within an inner area of the tapered portion 52 at the level of the interface 15. In the example of FIG. 2, the inner area of the tapered portion 52 is delimited by the peripheral edge 53.

Figure 3:
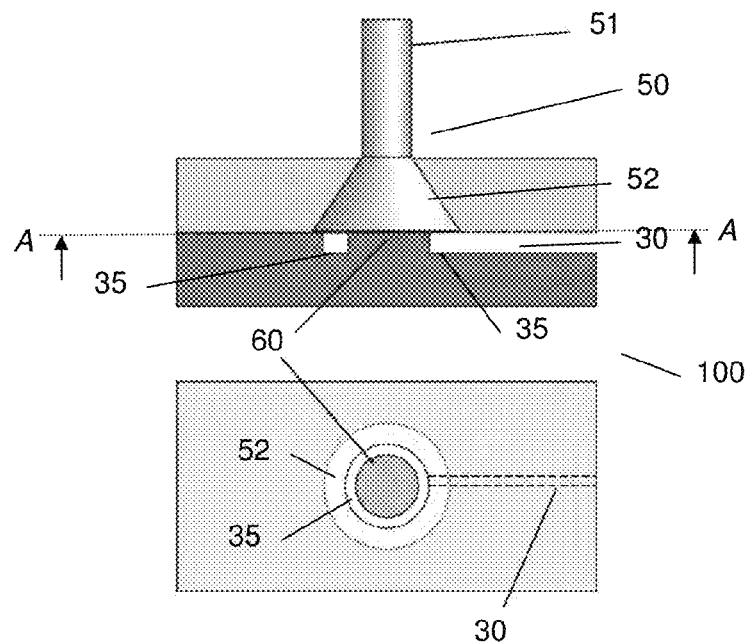
FIG. 3 shows a section view and bottom-view corresponding to still other embodiments of the device, wherein protrusions are provided at an end of a microchannel.
Figure 4:
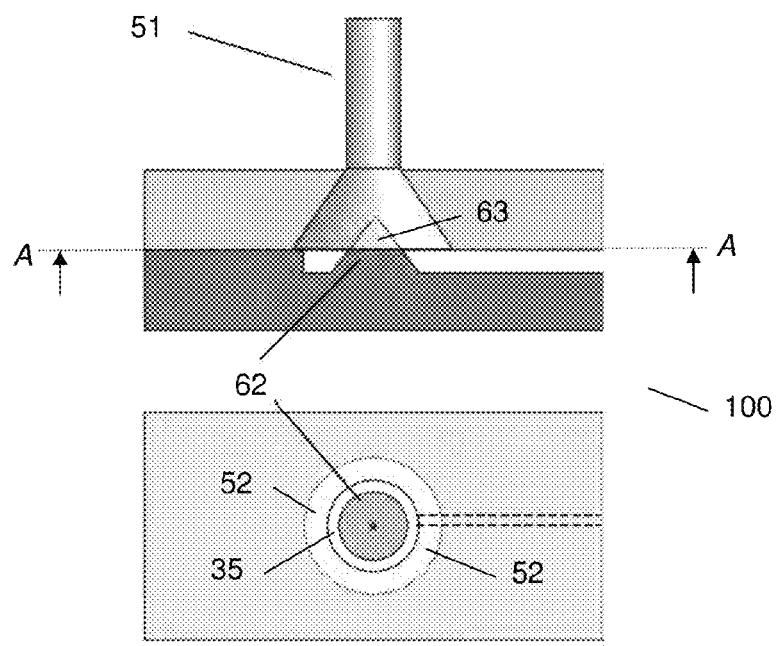
FIG. 4 shows a section view and bottom-view corresponding to still other embodiments of the device, wherein protrusions are provided at an end of a microchannel.

Now, tests have demonstrated that in geometries such as depicted in FIG. 2, region 35 can create dead-volume and bubbles might form, which is not desirable in some applications. Therefore, in embodiments such as depicted in FIGS. 3 and 4, the device 100 may further include a protrusion 60 and 62, respectively. In each figure, a side (section) view is complemented by a bottom (section) view, as seen from the plane AA. This protrusion may for instance have a cylindrical shape (e.g., a cylindrical post) or a tapered or conical shape (conical post) protruding from a lower surface of the depression 35 toward the tapered portion 52. As seen in FIG. 4, the protrusion may even protrude into the hollow (inner) space in the tapered portion 52, such that the latter covers an upper portion 63 of the protrusion 62. Such an additional structure, protruding out of plane, decreases the dead volume and accordingly decreases the risk of bubble formation. To that aim, the additional protrusion is preferably centered within the depression 35 and protrudes concentrically into the hollow cavity of the tapered section, resulting in a reduced hollow space in the depression 35 around the protrusion, wherein fluid can circulate. Now, other, specific out-of-plane geometries for the protrusion can be designed in order to reduce dead-volumes, increase/decrease fluidic mixing, create turbulence and/or reduce/increase the formation of air-bubbles, etc., depending on the desired application and applied conditions (fluid pressure, velocity, viscosity, etc.).

Figure 5:
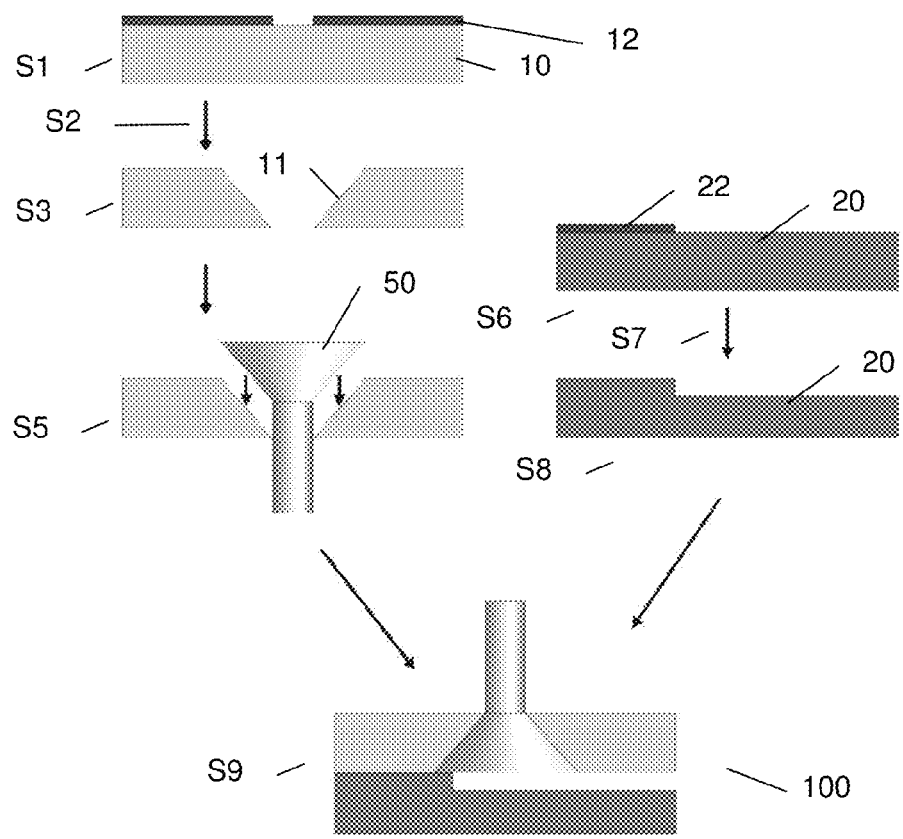
FIG. 5 illustrates steps of a method to fabricate a device such as depicted in FIG. 1, according to embodiments.

Next, some methods of fabrication of devices according to the above embodiments shall be discussed in reference to FIG. 5. Essentially, the fabrication includes the following steps:

S1-S3: the first layer 10 is provided with a via 11;
S5: a conduit 50 is inserted through the via 11, until the tapered portion fits in the correspondingly shaped via; and
S9: the first layer and the second layer are assembled, e.g., using anodic bonding. For example, an etched glass layer 10 and a silicon layer 20 are bonded by applying 1200 volts to an electrode for ~30 min, while the substrate is heated to 450° C.

Of course, the above steps assume that the layers 10 and 20 have already been machined, i.e., by way of respective patterning steps, e.g., using wet-etching or photolithography methods.

For example, as depicted in the embodiment of FIG. 5, each layer 10 and 20 can be coated with a photoresist layer 12 and 22 (steps S1 and S6, respectively). The desired patterns are next obtained by photolithography, followed by wet-etching, to obtain the vias in layer 10 and deep reactive ion etching is performed for the microfabrication of channels in layer 20, as illustrated in steps S2 and S7. Suitably machined layers 10 and 20 are accordingly obtained (steps S3 and S8, respectively), ready for assembly. Both layers are then assembled, e.g., anodically bonded with the conduit (the latter pre-assembled as in step S5). As said, an intermediate bonding layer might be involved, if necessary (not shown).

Note that the present designs and fabrication methods are amenable to mass fabricate microfluidic devices with a high density of interconnects. In this regards, through-vias 11 can be etched simultaneously. Considering for instance conduits having an outer diameter of 0.8 mm in the narrow pipe section 51 and approximately 1.5 mm in the wider section 52, fifty interconnects can be fit in a 1 $cm^2$ microfluidic device.

Figure 6:
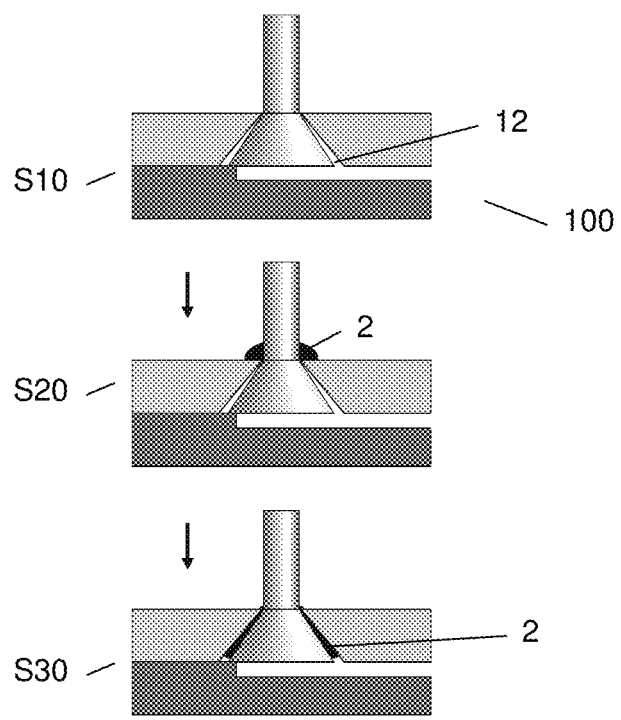
FIG. 6 illustrates steps where a bonding means such as epoxy is applied to fill a gap and ensure a leak-free interface device, the depicted device being a variant to FIG. 1 (section views)

Next, owing to necessary tolerances at the time of fabrication, some space may be left vacant between the outer envelope of the tapered section 52 and via 11, as depicted in FIG. 6, step S10. There, a leak-free interconnect can nonetheless be obtained by further applying a bonding means 2 (adhesive or glue such as epoxy) in space 12, as illustrated in FIGS. 6-7.

In FIG. 6, the adhesive is simply applied from the upper surface of layer 10 (step S20), and the adhesive creeps and fills (step S30) the gap 12 to ensure a leak-free interface.

Figure 7:
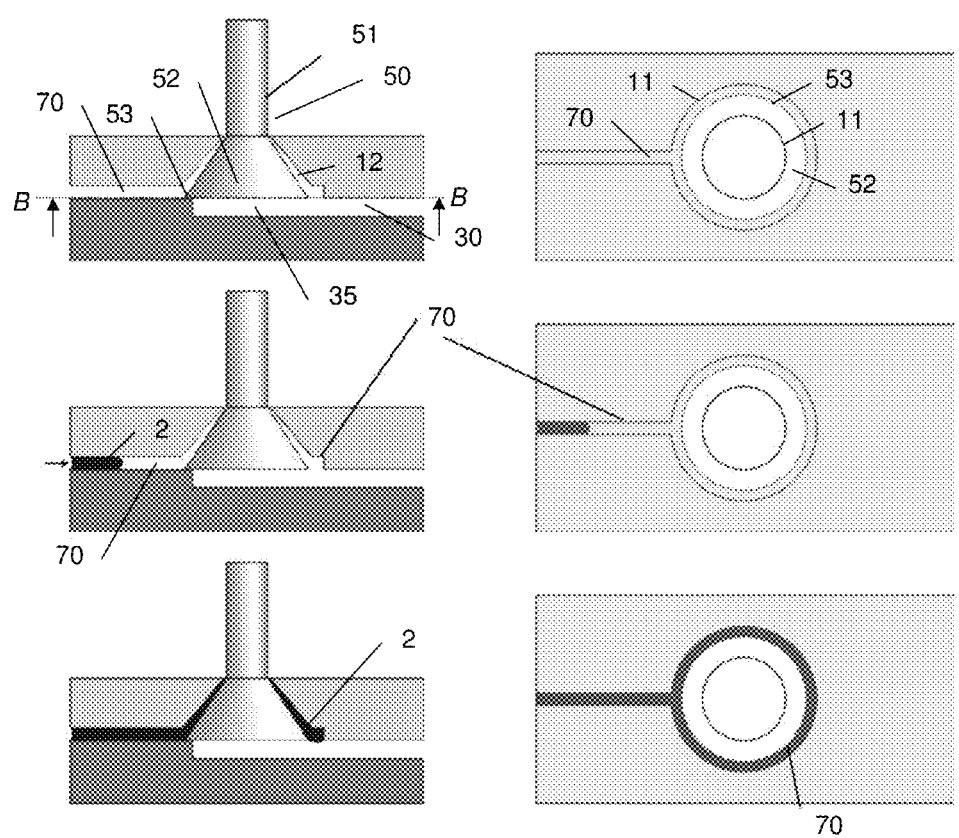
FIG. 7 illustrates variants to the device of FIG. 6, wherein an adhesive, or glue is introduced via a dedicated distribution channel (section and bottom views), according to embodiments.

As further exemplified in FIG. 7, exhibiting three side (section) views complemented by bottom views (seen from section BB), a somewhat more complex design can be relied upon. Here the device 100 further includes a bonding means distribution channel 70 which is in fluid communication with the gap 12. This distribution channel is essentially distinct from the microchannel 30 in that case. This way, the distribution channel ensures that the adhesive does not creep into the microfluidic channel. To this aim, the distribution channel is advantageously provided as a groove in the lower surface of layer 10, closed by layer 20 when assembling the layers, as depicted in FIG. 7. As a result, the direction of the distribution channel is perpendicular to the main axis of a conduit and the distribution channel is essentially in the same plane as the outer edge 53 of the tapered section 52. The distribution channel outlet leads to the space 12. Also, provided that a space (tolerance) remains vacant between the via and the tapered section all around the latter, the distribution channel may ensure uniform application of the adhesive around the interconnect, see the bottom views.

Figure 8:
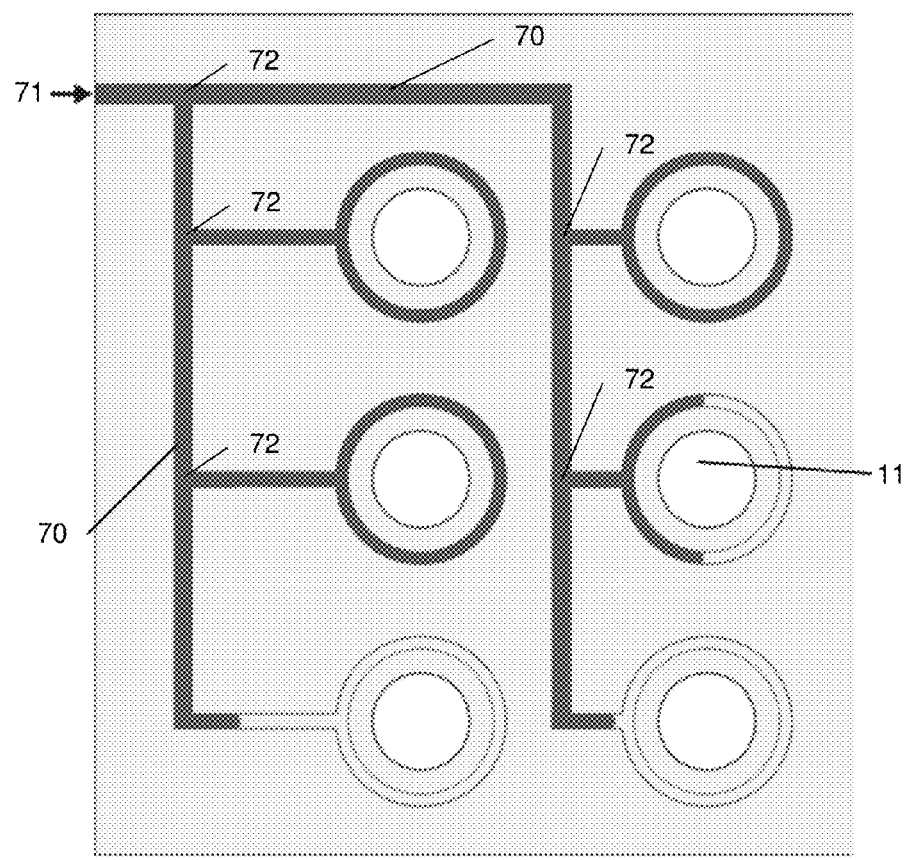
FIG. 8 illustrates an embodiment of a device including a network of distribution channels (bottom view).

In FIG. 8 (bottom view of layer 10 only), an embodiment is disclosed wherein a distribution channel network is provided, which ensures rapid and uniform distribution of the adhesive to a large number of interconnects. In short: the network is configured such that several distribution channels 70 split from a same inlet port 71, giving rise to several junctions 72, as illustrated. Other types of distribution channel network, e.g., with several inlet ports, can be contemplated, depending on the desired adhesive properties, the surface density of conduits, etc.

Below, a more detailed specification is given, corresponding to specific embodiments.

Materials for conduit:
Brass, tin coated, gold coated, copper coated;
Stainless steel, polymers, plastics mold injected with extrusion process;
Glass; and/or
Fused silica.

Dimensions for conduit:
Inner diameter $d_{pi}$ of the pipe portion: 0.5 mm;
Outer diameter dpo of the pipe portion: 0.8 mm;
Total length of the conduit (including the pipe and tapered section): 0.5-5 mm;
Length of "tapered" portion: 0.5 mm. Note that the conduit can be restricted to the sole tapered portions in embodiments;
Tapering (opening) angle α: 90° (β=135°);
Diameter $d_{mi}$ of the tapered section: 1.2 mm (dmo=1.5 mm);

Materials for the layers 10 and 20:
Glass (e.g., borofloat BF 33, Schott AG, Germany);
Silicon;
Hard plastics/polymers;
Metal; and/or
Ceramics. Note several materials can be involved within one layer if needed.

Dimensions for the first layer (layer 10):
Thickness: 0.5 mm;
Footprint (area of the chip): at least 4 mm² per conduit (depends on actual dimensions/material of the conduits/layers);
Adhesive distribution channel: depth: 10 to 150 μm, width: smaller than $d_{mi}$, e.g., 0.8 mm.

Dimensions for the second layer (layer 20):
Thickness: 0.5 mm;
Footprint (area of the chip): at least 4 mm² per conduit;
Microfluidic channel: depth: 10 to 150 μm, width: smaller than $d_{mi}$, e.g., 0.8 mm.

While the present invention has been described with reference to certain embodiments, it will be understood by those skilled in the art that various changes can be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims. For example, present devices may be embodied with conduits inserted through each of the superimposed layers 10 and 20, in opposite or same directions, and possibly connected through adjoining microchannels. Several designs of microchannels could be contemplated that link to the conduits. Several superimposed layers similar to layers 10 and 20 can be fabricated, with conduits inserted though two or more layers and microchannels grooved at several interfaces, such as to enable fluid communication between three or more layers, etc. Interface layers could still be provided between a pair of layers 10 and 20, etc.

What is claimed is:

1. A microfluidic device comprising:
a first layer;
a second layer, wherein said first layer and said second layer are assembled to face each other;
a microchannel in said second layer;
a tapered conduit having a tapered portion, wherein said tapered portion is inserted in a correspondingly shaped via formed in said first layer at the level of an end of said microchannel such that fluid communication is enabled between said microchannel and said conduit, and blocked in said via by way of the assembled first layer and second layer, and
a bonding means comprised in a space between said tapered portion and said correspondingly shaped via to form a leak-free interface therebetween, and
a bonding means distribution channel in fluid communication with said space, wherein said bonding means distribution channel is distinct from said microchannel.

2. The device according to claim 1, wherein said tapered portion has a lower end contacting an upper surface of said second layer, such that it is blocked in said via.

3. The device according to claim 1, wherein at least a portion of said microchannel is a groove open on an upper surface of said second layer, said groove closed by a portion of a lower surface of said first layer, said lower surface of said first layer facing said upper surface of said second layer, and said conduit extends along a direction perpendicular to an interface of said first layer and said second layer.

4. The device according to claim 1, wherein the end of said microchannel is a depression within said second layer, facing said tapered portion, said depression having an open area co-planar with and included within an inner area of said tapered portion at the level of an interface of said first layer and said second layer.

5. The device according to claim 4, further comprising a protrusion protruding from a lower surface of said depression toward said tapered portion, wherein said protrusion has at least one of a tapered and conical shape.

6. The device according to claim 5, wherein said protrusion extends into said tapered portion.

7. The device according to claim 1, wherein said tapered portion exhibits an average opening angle (α) between 60° and 120°.

8. The device according to claim 7, wherein said tapered portion exhibits an average opening angle (α) between 81° and 99°.

9. The device according to claim 1, wherein a height of said tapered portion, as measured along a fluid path direction in said conduit, is equal to a thickness of said first layer, said first layer being larger than 0.3 mm.

10. The device according to claim 9, wherein said first layer is equal to 0.5 mm.

11. The device according to claim 1, wherein said conduit is a single body and coated with a thin-film material to make it chemically inert.

12. The device according to claim 1, wherein said bonding means is an epoxy.

13. The device according to claim 1, wherein:
said conduit further comprises a pipe, in addition to said tapered portion, wherein the tapered portion is inserted in said correspondingly shaped via formed in said first layer at the level of the end of said microchannel, such that fluid communication is enabled between said microchannel and said pipe, the latter extending from said first layer opposite to said second layer, and wherein:
an average outer diameter ($d_{po}$) of said pipe is less than 1.6 mm; and
an average outer diameter ($d_{mo}$) of said tapered portion is less than 3.0 mm.

14. The device according to claim 13, wherein:
said average outer diameter ($d_{po}$) of said pipe is less than 1.0 mm; and
said average outer diameter ($d_{mo}$) of said tapered portion is less than 2.0 mm.

15. The device of according to claim 1, wherein:
said conduit further comprises a pipe, in addition to said tapered portion, wherein said tapered portion is inserted in said correspondingly shaped via formed in said first layer at the level of the end of said microchannel, such that fluid communication is enabled between said microchannel and said pipe, the latter extending from said first layer opposite to said second layer, wherein:
an average inner diameter ($d_{pi}$) of said pipe is between 0.3 and 0.7 mm, and equal to 0.5 mm; and
an average inner diameter ($d_{mi}$) of said tapered portion is between 0.8 and 1.6 mm.

16. The device according to claim 15, wherein:
said average inner diameter ($d_{pi}$) of said pipe is equal to 0.5 mm; and
said average inner diameter ($d_{mi}$) of said tapered portion is equal to 1.2 mm.

17. The device according to claim 1 comprising:
a first set of microchannels, each provided at the level of an interface of said first layer and said second layer, said first layer and said second layer facing each other;
a second set of tapered conduits, each comprising a tapered portion inserted in a respective, correspondingly shaped via formed in said first layer at the level of an end of said microchannel of said first set, such that fluid communication is enabled between said microchannel of said first set and said tapered conduit.

18. The device according to claim 1, further comprising a tube inserted in said tapered conduit, opposite to said second layer.

19. A method of fabrication of a microfluidic device, comprising:
patterning a first layer and a second layer to respectively obtain a shaped via and a microchannel;
inserting a conduit through said via, until a tapered portion fits in a correspondingly shaped via formed in said first layer; and
assembling said first layer and said second layer so as to bond them, wherein said via is assembled over said microchannel.

* * * * *